G. C. Taft.

Wrench.

No. 3918. Reissued Apr. 12. 1870.

Witnesses

S. N. Piper

J. A. Snow

Loring Coes by his attorney

R. H. Eddy

N. PETERS, PHOTO-LITHOGRAPHER, WASHINGTON, D. C.

United States Patent Office.

LORING COES, OF WORCESTER, MASSACHUSETTS, ASSIGNEE OF GEORGE C. TAFT.

*Letters Patent No.* 88,230, *dated March* 23, 1869; *reissue No.* 3,918, *dated April* 12, 1870.

IMPROVEMENT IN WRENCHES.

The Schedule referred to in these Letters Patent and making part of the same

*To all persons to whom these presents may come:*

Whereas, Letters Patent No. 88,230, dated March 23, 1869, have been granted to me, LORING COES, of the city and and county of Worcester, of the State of Massachusetts, on an Invention having reference to Wrenches; such invention having been made by George C. Taft, of the said Worcester, and assigned to the undersigned; and whereas I, the said LORING COES, have applied for a reissue of the patent aforesaid on a new and amended specification: now, therefore, I do hereby declare the said invention to be fully described as follows, and represented in the accompanying drawings, of which—

Figure 1:
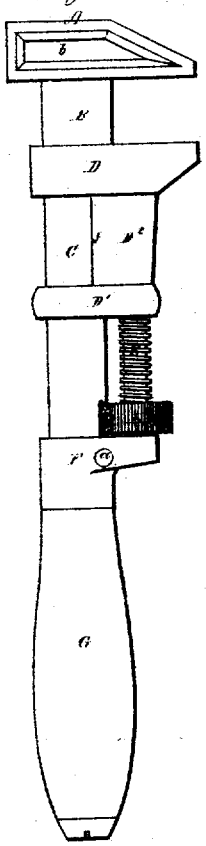

Figure 1 exhibits a side view; and

Figure 2:
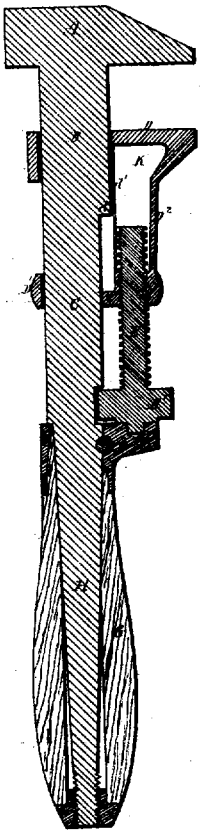

Figure 2 a longitudinal section of a wrench embodying the invention.

Figure 3:
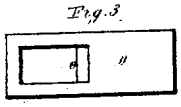

Figure 3 is a top view.

Figure 4:
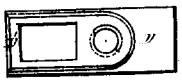

Figure 4 a bottom view.

Figure 5:
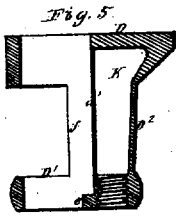

Figure 5 a vertical or longitudinal section; and

Figure 6:
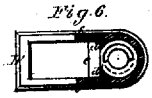

Figure 6 a transverse section of the movable jaw-carrier.

The nature of the invention or improvements may be said to consist in whole or in part as follows:

First. In the peculiar construction of the shank of the hammer-jaw, it being made broader in that part on which the movable jaw is to slide than in the remainder of the shank, such being as represented in fig. 2 of the drawings, and as hereinafter more particularly described.

Second. In the peculiar construction of the movable jaw-carrier, viz, with lips or projections to extend to or overlap the sides of the narrower part of the shank of the hammer-jaw, so as to hide from view not only the shoulder at the junction of the narrower and wider parts of such shank, but all of the space between such shoulder and the collar of the jaw-carrier.

Third. In a peculiar construction of the head when cast in one piece with the shank or bar, viz, with a recess in either or each of the opposite sides of such head, the same being to prevent the separation of the head from the bar during the process of solidifying the two from a molten state.

Fourth. In the combination and arrangement of a holding-pin with the ferrule shank and other main parts of the wrench.

In the drawings A denotes the head, stationary or hammer-jaw, as it is usually styled, such having the shank B C H extended from it in manner as represented.

The upper portion B of the said shank, or that part of it on which the movable jaw D is to slide, is made wider than the part C, on which the collar $D^1$ of the movable jaw-carrier $D^2$ is to slide, the extension of the part B beyond the part C forming at their junction a shoulder, *d*.

The hammer-jaw or head A is recessed on either or each of its opposite sides, as shown at *b* in fig. 1. The head and the shank, when formed by being cast together in a mold, so as to be in one piece of metal, such as is termed malleable cast iron, are liable to break away from each other during the process of solidifying from the molten state. To obviate or prevent this, or render it less likely to occur, the head is to be recessed in manner substantially as above mentioned.

By reducing the bar or shank as shown at C, metal is saved without materially affecting the strength of the wrench on the part most liable to breakage, viz, that part marked B, which usually extends between the jaws while the wrench may be in use.

The movable jaw-carrier is chambered, as shown at K, there being in front of the chamber shoulders or bearings *d' d'*, to rest against the rear edge of the part B, and also a third shoulder or bearing, *e*, to rest against the rear edge of the part C of the shank or bar.

The chamber K, in its transverse section, is to be larger than that of the operative screw E, a female screw being cut in the lower part of the carrier to receive the said screw E.

This latter screw E is provided with a milled head, E', which is pivoted to the ferrule F and extended into a recess, *r*, made in the shank, the whole being as shown in fig. 2.

The ferrule formed as represented with a projecting and socketed arm, is secured to the shank by a pin, *a*, going transversely through the ferrule, and extending into a recess formed in the rear side of the shank. (See fig. 2.)

The pin not only secures the ferrule to the shank, but operates to prevent the former from being pressed back on the shank, and against the wooden handle G, so as to injure the latter or disturb its true relation with the shank.

The movable jaw-carrier is also provided with two lips, *f f*, extended from the bearings or shoulders *d' d'*, to or so as to lap on the opposite sides of the part C in order to cover and hide from view the space within the carrier that would otherwise appear directly below the shoulder *d*.

These lips are also to prevent dirt or extraneous matters from getting into the chamber K, and thereby doing injury to the screws and the bearing parts of the carrier and the shank.

What is claimed herein, as the invention of the said Taft, is as follows, viz:

The hammer-jaw shank made substantially as described, viz, with the part B wider than the part C or remainder of the shank, as set forth.

Also, the movable jaw and its carrier, as made or combined with the side lips *f f* to project therefrom beyond the bearings or parts to rest against the rear face of the part B of the shank, the whole being as and for the purpose substantially as specified.

Also, the head A recessed as described when cast in one piece with the shank.

Also, the movable jaw D and its carrier $D^2$ recessed or chambered as described when cast in one piece.

Also, the combination and arrangement of the holding pin *a* with the armed ferrule, the shank or bar, the operative screw, the hammer-jaw, and the movable jawed carrier, the whole being substantially as set forth.

LORING COES.

Witnesses:
R. H. EDDY,
J. R. SNOW.